United States Patent
Stoller et al.

(10) Patent No.: US 11,985,915 B2
(45) Date of Patent: May 21, 2024

(54) FLUID COVERING IMPLEMENT

(71) Applicant: Precision Planting LLC, Tremont, IL (US)

(72) Inventors: Jason Stoller, Eureka, IL (US); Paul Wildermuth, Tremont, IL (US); Ian Radtke, Washington, IL (US); Cory Muhlbauer, Bloomington, IL (US)

(73) Assignee: Precision Planting LLC, Tremont, IL (US)

( * ) Notice: Subject to any disclaimer, the term of this patent is extended or adjusted under 35 U.S.C. 154(b) by 217 days.

(21) Appl. No.: 16/492,417

(22) PCT Filed: Mar. 7, 2018

(86) PCT No.: PCT/US2018/021321
§ 371 (c)(1),
(2) Date: Sep. 9, 2019

(87) PCT Pub. No.: WO2018/165282
PCT Pub. Date: Sep. 13, 2018

(65) Prior Publication Data
US 2020/0037496 A1 Feb. 6, 2020

Related U.S. Application Data

(60) Provisional application No. 62/469,371, filed on Mar. 9, 2017, provisional application No. 62/501,598, filed on May 4, 2017.

(51) Int. Cl.
*A01C 13/00* (2006.01)
*A01B 39/08* (2006.01)
(Continued)

(52) U.S. Cl.
CPC .............. *A01C 13/00* (2013.01); *A01B 39/08* (2013.01); *A01B 39/14* (2013.01); *A01B 49/06* (2013.01); *A01C 21/002* (2013.01); *A01C 23/025* (2013.01)

(58) Field of Classification Search
CPC ......... A01C 5/066; A01C 5/068; A01C 13/00; A01C 21/002; A01C 23/023;
(Continued)

(56) References Cited

U.S. PATENT DOCUMENTS

| | | |
|---|---|---|
| 2,222,015 A | 11/1940 | Bateman |
| 3,362,361 A | 1/1968 | Morrison, Jr. |

(Continued)

FOREIGN PATENT DOCUMENTS

| | | | | |
|---|---|---|---|---|
| EP | 2823700 A1 | * | 1/2015 | ............ A01B 63/24 |
| FR | 2885008 A1 | * | 11/2006 | ........... A01B 29/043 |

(Continued)

OTHER PUBLICATIONS

European Patent Office, Search Report for related European Application No. 18763775.6, dated Oct. 27, 2020.
(Continued)

*Primary Examiner* — Jamie L McGowan

(57) ABSTRACT

An implement having a frame and a soil moving implement that is attached to the frame. The soil moving implement is disposed in a row between plants for moving soil from between rows of plants to at least the rhizosphere of the plants to cover fluid that is deposited in the rhizosphere.

23 Claims, 12 Drawing Sheets

Figure 4A:
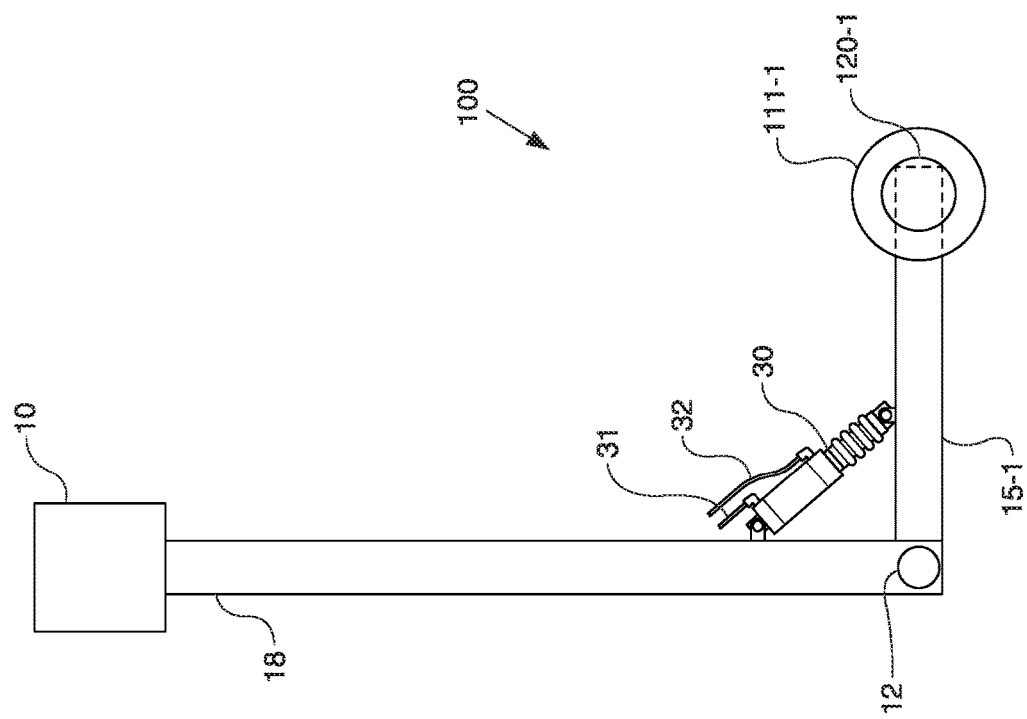

(51) Int. Cl.
*A01B 39/14* (2006.01)
*A01B 49/06* (2006.01)
*A01C 21/00* (2006.01)
*A01C 23/02* (2006.01)

(58) Field of Classification Search
CPC ..... A01C 23/025; A01C 23/047; A01B 39/08; A01B 39/14; A01B 49/06
See application file for complete search history.

(56) References Cited

U.S. PATENT DOCUMENTS

| | | | |
|---|---|---|---|
| 3,963,079 A * | 6/1976 | Carlucci | A01B 35/18 172/200 |
| 4,054,007 A | 10/1977 | Moore | |
| 4,092,936 A | 6/1978 | Griffin et al. | |
| 4,211,285 A * | 7/1980 | Pajtas | A01B 39/14 172/156 |
| 4,585,073 A * | 4/1986 | Mayeda | A01B 39/14 172/158 |
| 4,779,684 A * | 10/1988 | Schultz | A01B 35/18 171/62 |
| 7,314,012 B2 * | 1/2008 | Wuertz | A01C 5/064 111/165 |
| 10,004,175 B1 | 6/2018 | Miller | |
| 10,426,076 B1 * | 10/2019 | Rosenboom | A01B 5/04 |
| 2002/0017481 A1 | 11/2002 | Hagny | |
| 2002/0174813 A1 | 11/2002 | Hagny | |
| 2006/0283610 A1 | 12/2006 | Sugano et al. | |
| 2007/0095261 A1 * | 5/2007 | Mariman | A01C 5/068 111/164 |
| 2008/0302282 A1 * | 12/2008 | Martin | A01C 7/006 111/164 |
| 2011/0203818 A1 | 8/2011 | Hicks et al. | |
| 2014/0026792 A1 | 1/2014 | Bassett | |
| 2014/0048297 A1 * | 2/2014 | Bassett | A01B 61/046 172/260.5 |
| 2014/0197249 A1 | 7/2014 | Roth et al. | |
| 2016/0338260 A1 * | 11/2016 | Hahn | A01C 5/068 |
| 2017/0049043 A1 * | 2/2017 | Muff | A01C 5/062 |
| 2017/0215334 A1 * | 8/2017 | Dienst | A01C 7/205 |
| 2018/0288939 A1 * | 10/2018 | Bassett | A01D 34/535 |

FOREIGN PATENT DOCUMENTS

| | | |
|---|---|---|
| FR | 3 036 019 A1 | 11/2016 |
| JP | H02 69102 A | 3/1990 |
| JP | 2005006550 A | 1/2005 |
| JP | 2010193776 A | 9/2010 |
| RU | 2483518 C1 * | 6/2013 |

OTHER PUBLICATIONS

Lines-Kelly, Rebecca, "The rhizosphere", Soil Biology Basics, Published by New South Wales Department of Primary Industries, 2005, NSW, AU, www.dpi.nsw.gov.au.
USPTO, International Search Report for related International Application No. PCT/US2018/021321, mail date May 23, 2018.
European Patent Office, Examination Report for related European Application No. 18763775.6, dated Jan. 27, 2022.

* cited by examiner

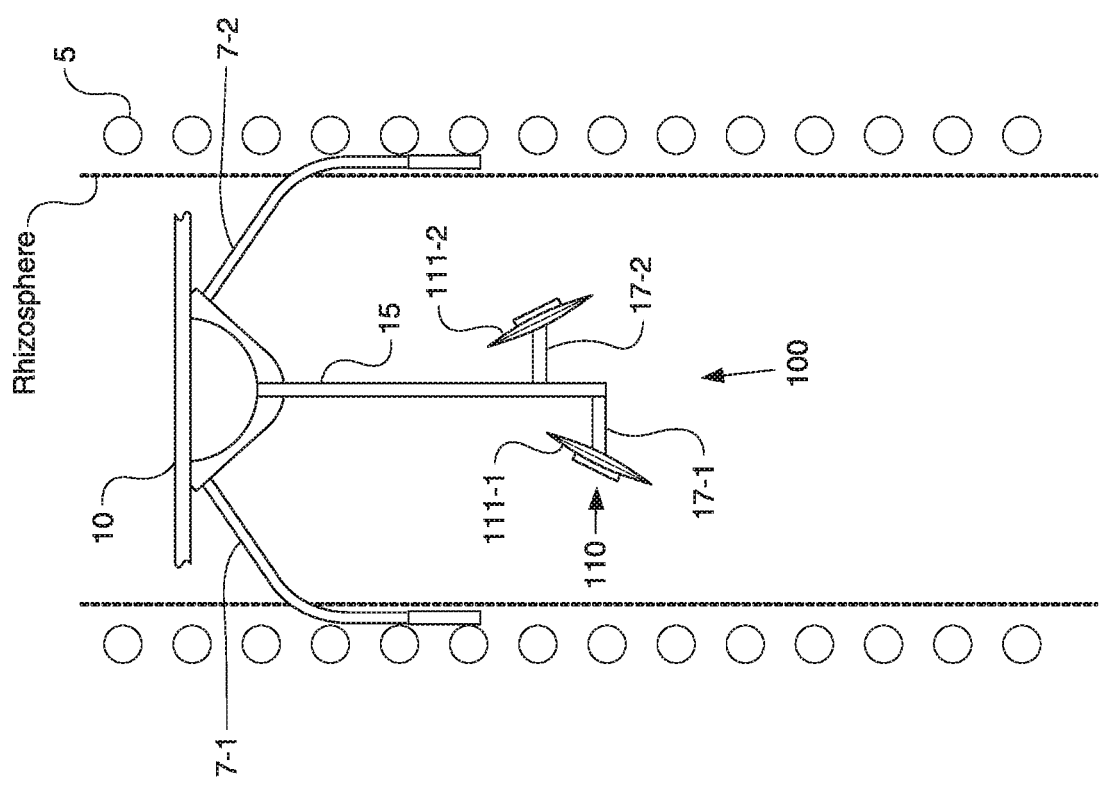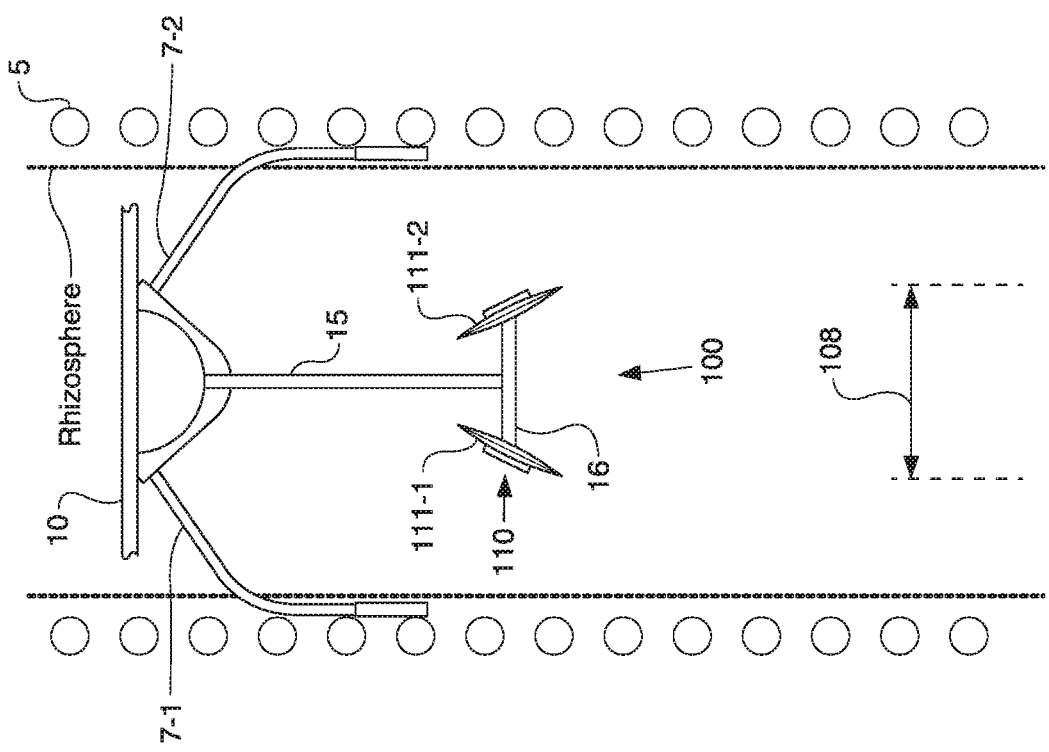

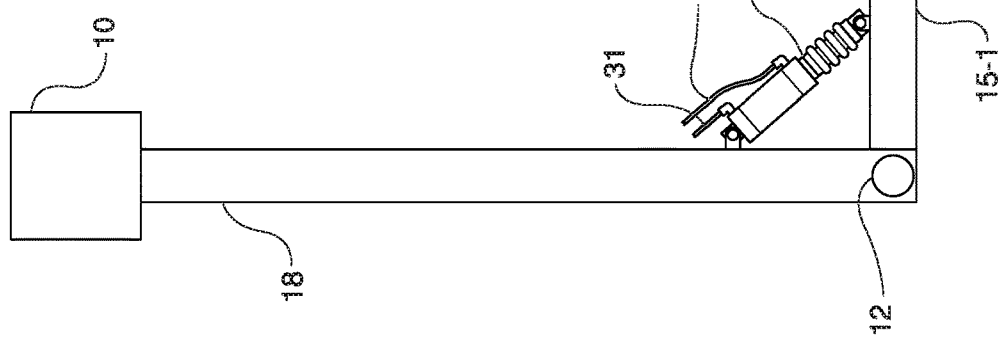
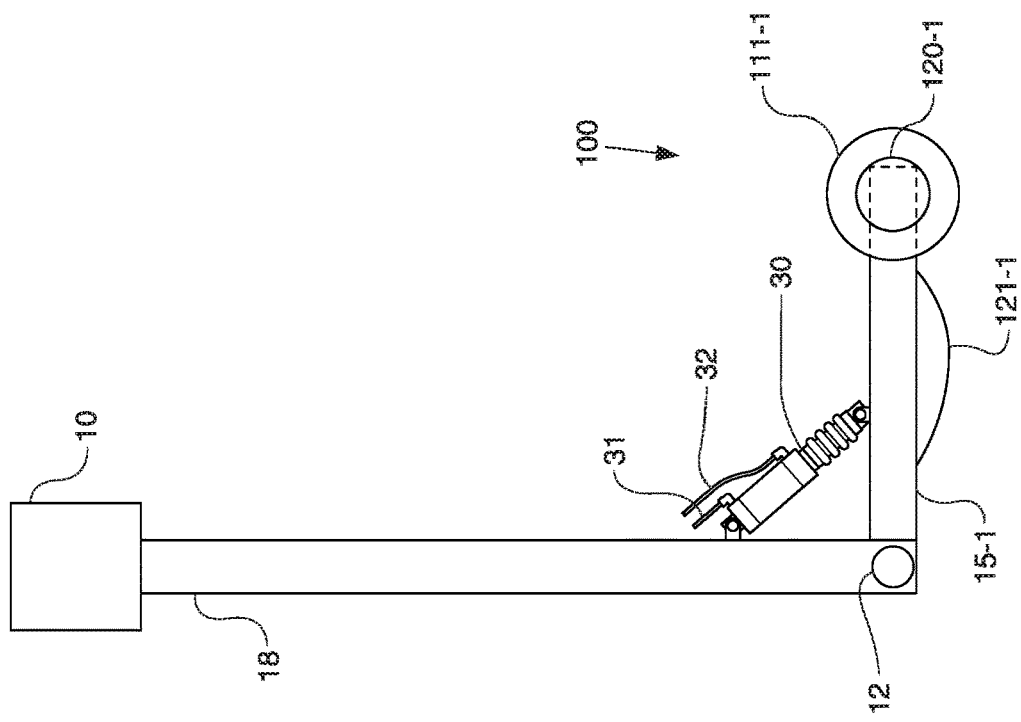

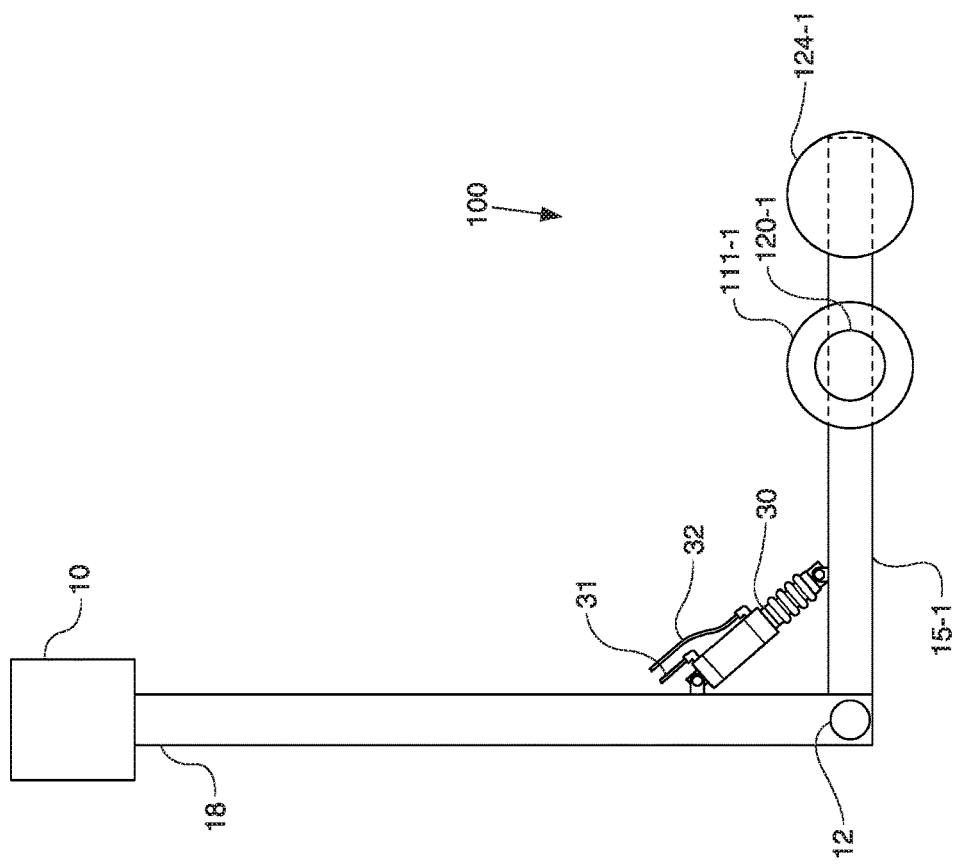
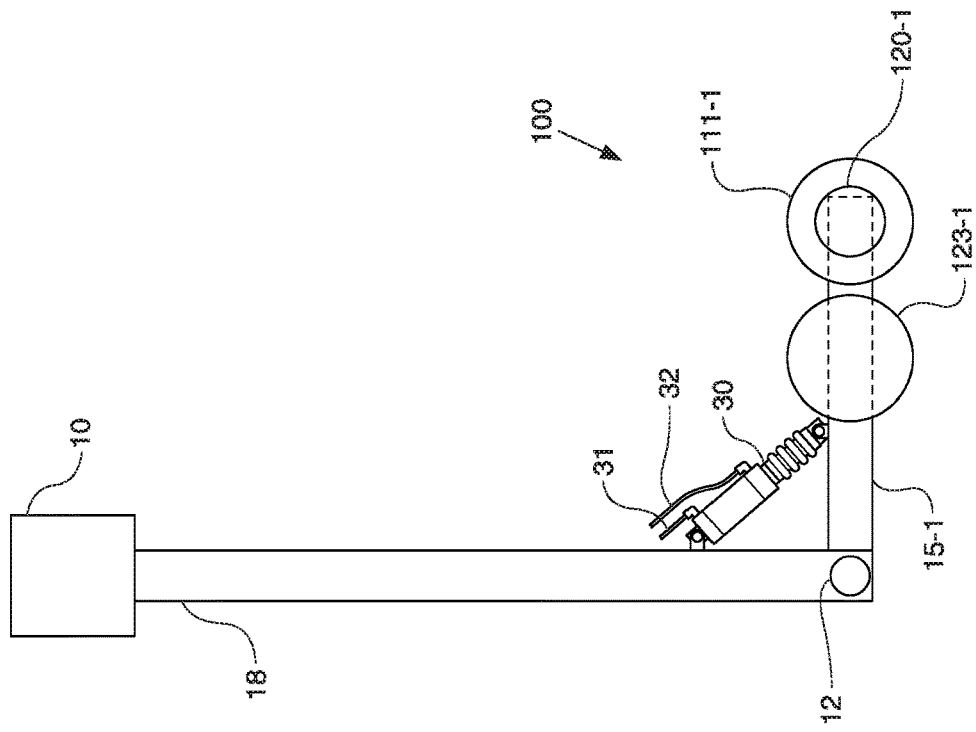

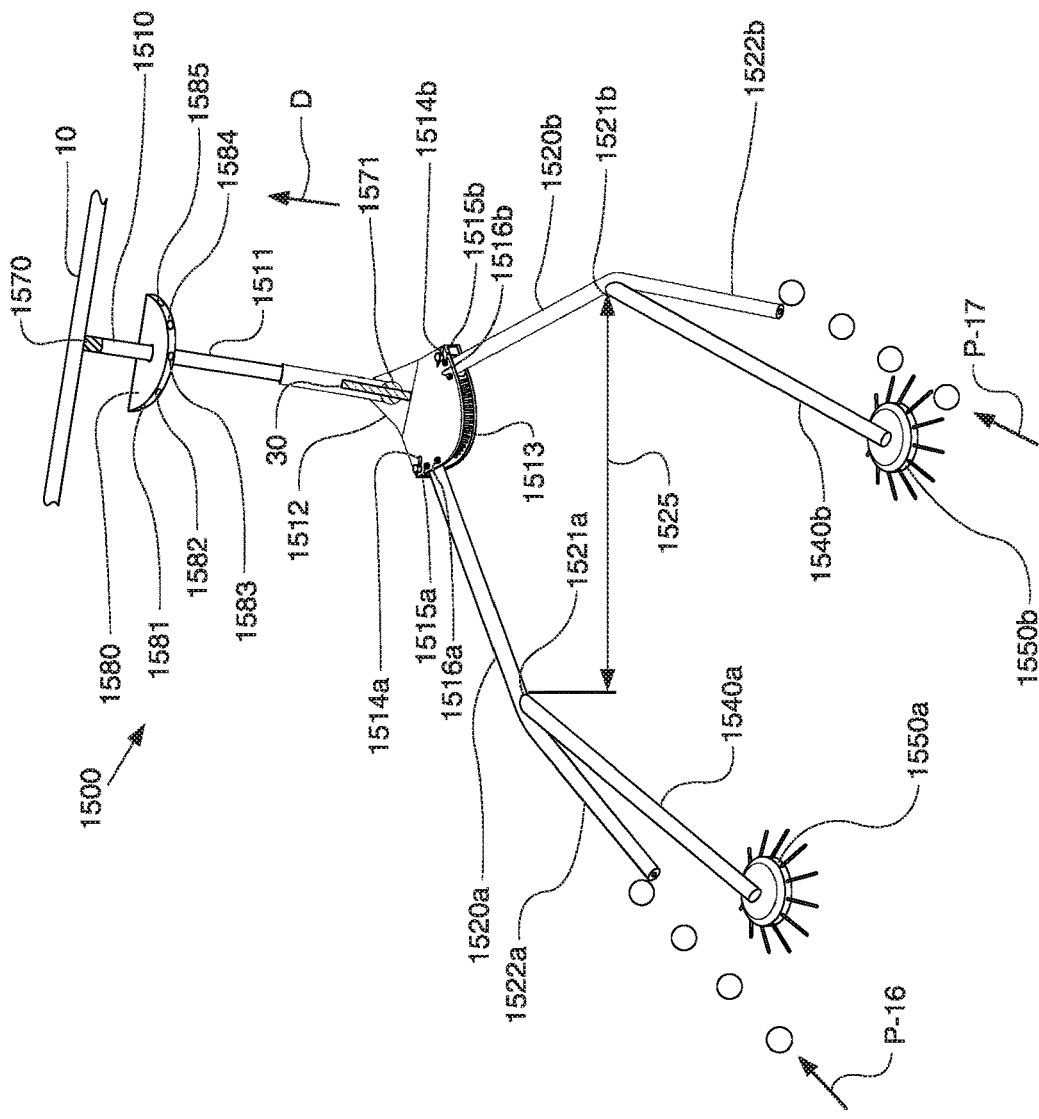

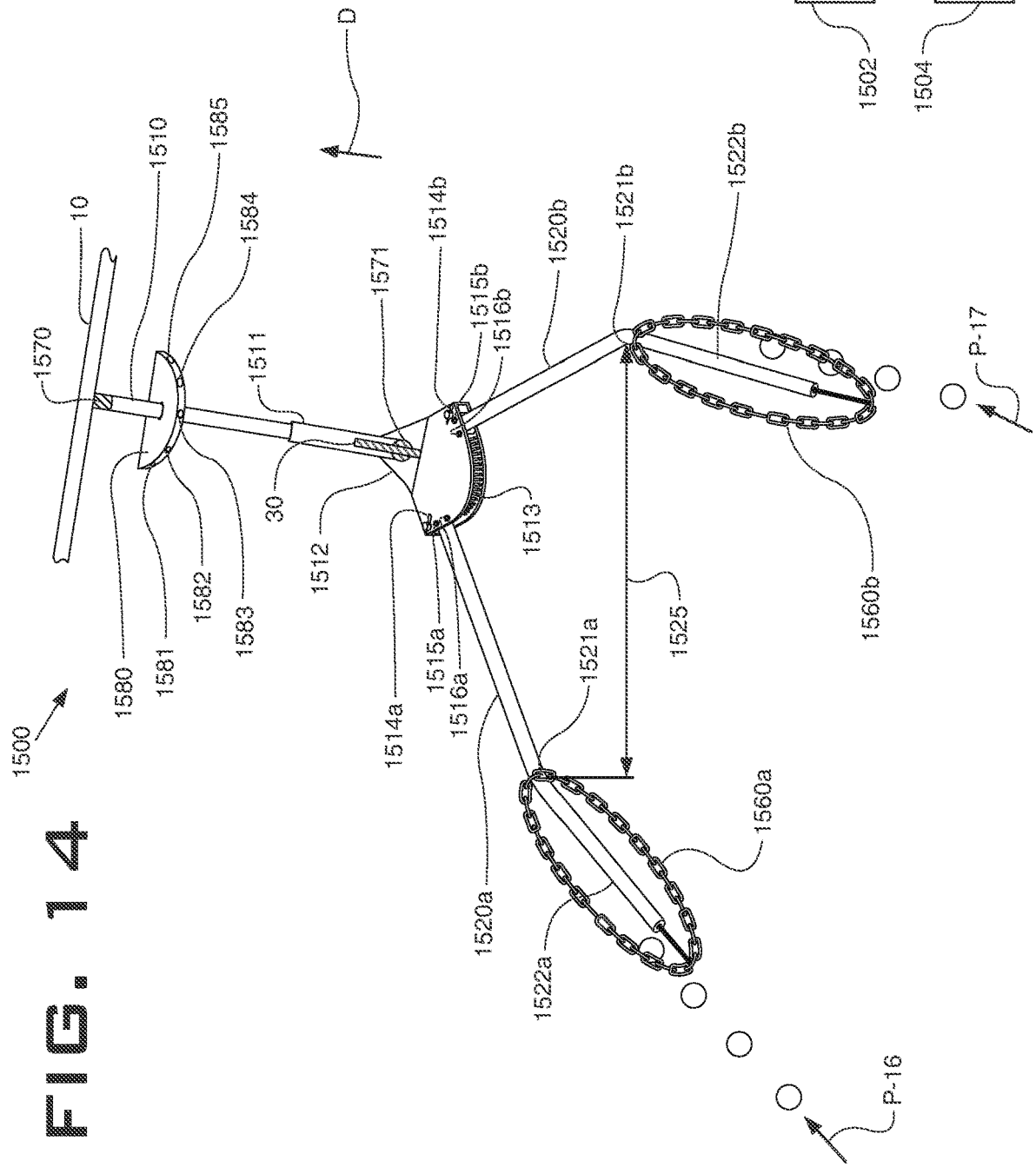

FLUID COVERING IMPLEMENT

RELATED APPLICATIONS

This application claims the benefit of U.S. Provisional Application No. 62/469,371, filed on Mar. 9, 2017 entitled: FLUID COVERING IMPLEMENT and U.S. Provisional Application No. 62/501,598, filed on May 4, 2017 entitled: FLUID COVERING IMPLEMENT, which are incorporated by reference herein.

TECHNICAL FIELD

Embodiments of the present disclosure relate to an implement for moving soil to cover applied fluids.

BACKGROUND

There are liquid dispensing systems for dispensing liquids in the rhizosphere of plants. Examples of these systems are the Y-Drop applicator from 360 Yield Center and NutraBoss applicator from NutraBoss. These liquid dispensing systems apply fertilizer on the surface, and on their own, they can be subject to significant nutrient loss through volatilization.

BRIEF DESCRIPTION OF THE DRAWINGS

The present disclosure is illustrated by way of example, and not by way of limitation, in the figures of the accompanying drawings and in which:

FIG. 1 shows top view of a fluid covering implement having two discs disposed on an axle according to one embodiment.

FIG. 2 shows a top view of a fluid covering implement having two discs offset from each other on different axles according to one embodiment.

FIG. 3 shows top view of a fluid covering implement having two discs each disposed on separate supports according to one embodiment.

FIG. 4A shows a side elevation view of the embodiment of FIG. 1 and including a biasing member.

FIG. 4B shows a modification of the embodiment of FIG. 4A and including a ski disposed under the support member ahead of the disc.

FIG. 4C shows a modification of the embodiment of FIG. 4B with the ski attached to the end of the support member.

FIG. 4D shows a modification of the embodiment of FIG. 4A and including a wheel ahead of the disc on the support member.

FIG. 4E shows a modification of the embodiment of FIG. 4D with the wheel behind the disc on the support member.

FIG. 5 shows perspective view of a fluid covering implement disposed on a fluid application apparatus according to one embodiment.

FIG. 6A shows a side elevation view of fluid covering implement disposed on coulter mounting bracket according to one embodiment.

FIG. 6B is a front elevation view of the embodiment of FIG. 6A.

FIG. 7A shows a side elevation view of a disc and depth guide according to one embodiment.

FIG. 7B shows a top view of the embodiment of FIG. 7A and further including a deflector according to one embodiment.

FIG. 8 shows a top view of a fluid covering implement with a plow according to one embodiment.

FIG. 9 shows a top view of a fluid covering implement with knives according to one embodiment.

FIG. 10 shows a perspective view of offset discs with depth guides and deflector according to one embodiment.

FIG. 11A shows a side view of a fluid covering implement disposed on a beam that is connected to a frame through a support member according to one embodiment.

FIG. 11B is a partial top view of the beam and discs of FIG. 11A.

FIG. 12 shows perspective view of a fluid covering implement disposed on a fluid application apparatus according to one embodiment.

FIG. 13A shows perspective view of a fluid covering implement disposed on a fluid application apparatus according to one embodiment.

FIG. 13B is a side elevation view of the soil roughener of FIG. 13A.

FIG. 14 shows perspective view of a fluid covering implement disposed on a fluid application apparatus according to one embodiment.

FIG. 15 illustrates a method for covering fluid deposited in the rhizosphere of plants growing in a field in accordance with one embodiment.

BRIEF SUMMARY

Embodiments of the present disclosure relate to an implement for moving soil from between rows of plants to at least the rhizosphere of the plants to cover fluid that is deposited in the rhizosphere.

DETAILED DESCRIPTION

Fluids (such as liquids or gases) can be applied to the rhizosphere of plants 5 to deliver fluids such as fertilizer, insecticide, or herbicides to the rhizosphere or in direct contact with plants 5. Examples of implements that apply fluids to the rhizosphere can be found in U.S. Patent Application Nos. 62/324,095; 62/365,824; and 62/442,895 and in U.S. Patent Application Publication Nos. US2013043326, US20170049043, and US20160120117, all of which are incorporated herein by reference. Because of volatilization, these implements are generally limited in the types of fluid that can be applied. While any fluid could be applied with these implements, fluids that are volatile or evaporate before the fluid is absorbed into the soil are less favored because of fluid loss. These implements are disposed in-between rows of growing crops. For simplicity, these implements are illustrated in the Figures having tubes 7-1 and 7-2 for applying fluid.

The fluid covering implement 100 moves soil from between the rows of growing plants 5 and covers fluids that are applied at least to the rhizosphere of plants 5. In another embodiment, fluid covering implement moves soil from between the rows of growing plants 5 to 0 to 5 inches (0 to 12.7 cm) from the plants 5. In other embodiments, the soil is moved to 0 to 4 inches (0 to 10.2 cm), 0 to 3 inches (0 to 7.6 cm), 0 to 2 inches (0 to 5.1 cm), or 0 to 1 inch (0 to 2.5 cm) from the plants 5. In another embodiment, fluid covering implement 100 moves soil from between the rows of growing plants 5 such that the moved soil is in contact with the plants 5.

Fluid covering implement 100 includes a soil mover 110 (or soil moving implement 110) that moves soil from between the rows of crops to cover soil on one or both sides of the row. Soil mover 110 can be a disc 111, a plow 112, or a knife 113. In one example, a soil moving implement includes at least one disc, plow, or knife that are positioned or disposed in a middle region 108 between rows of plants. An edge or boundary of the middle region is a certain distance (e.g., 3-15 inches) from each rhizosphere of the rows of plants depending on the spacing of rows of plants. The soil moving implement moves soil from the middle region to cover soil of the rhizosphere.

Disc 111 can be any shaped coulter disc or cleaning wheel. Examples of discs and cleaning wheels include, but are not limited to, flat, notched, fluted, wavy, rippled, spiked, flat with spikes, notched with spikes, fluted with spikes, wavy with spikes, and rippled with spikes.

Figure 7B:
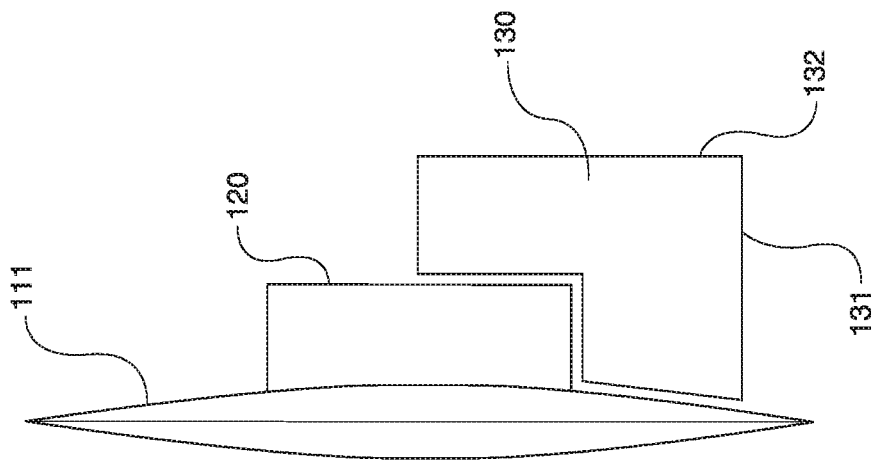
Figure 7A:
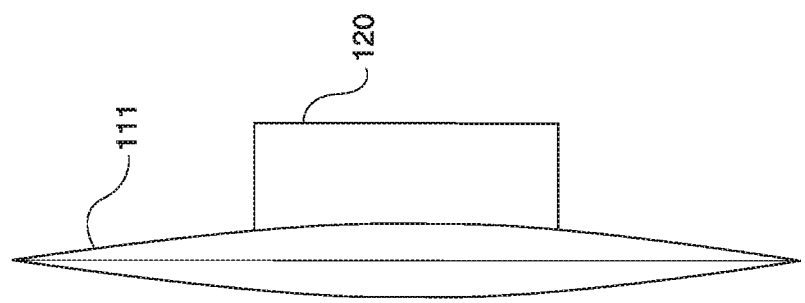
Figure 9:
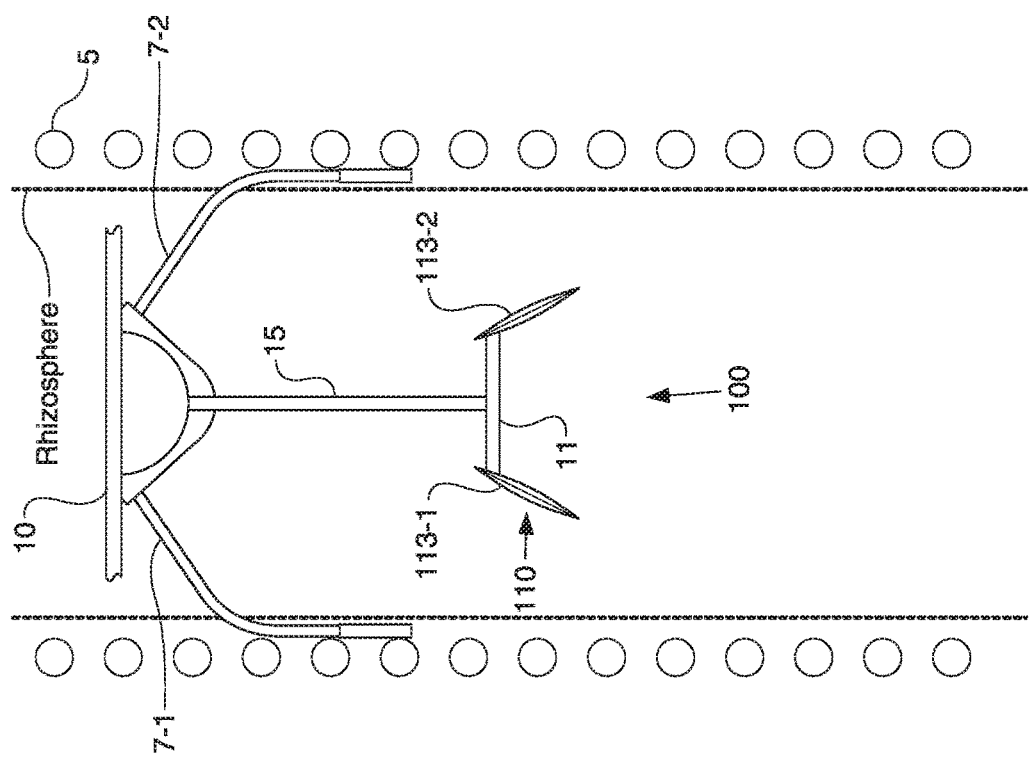
Figure 8:
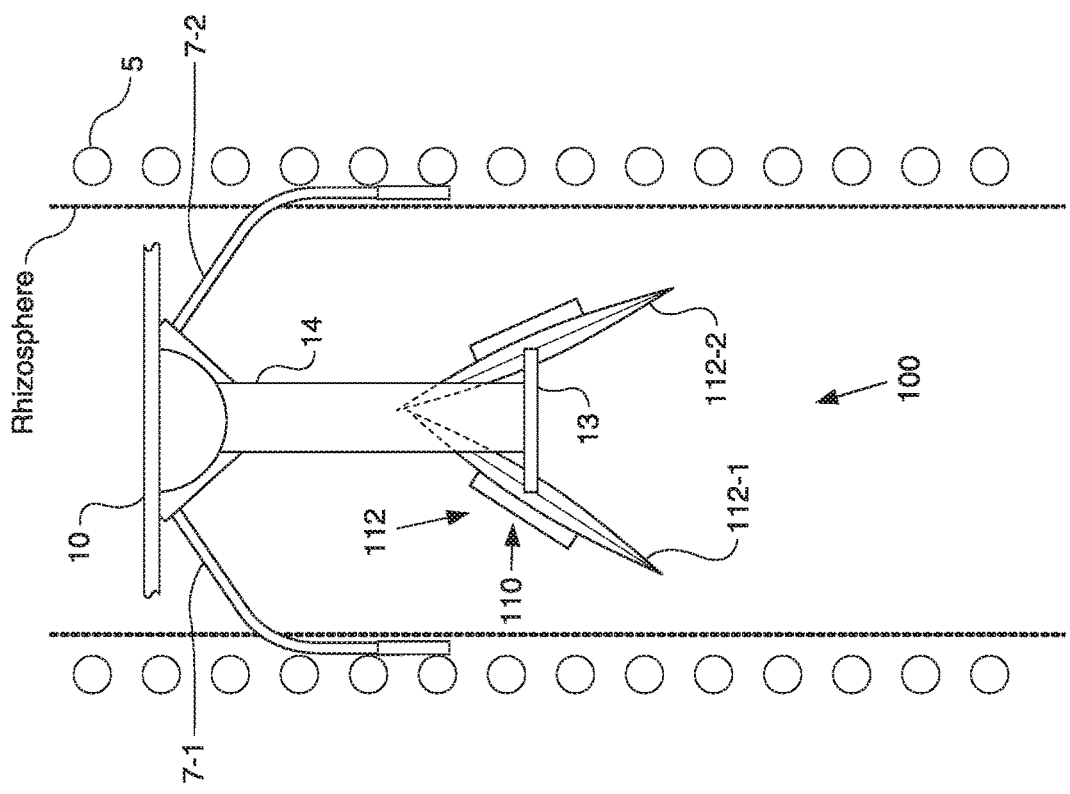
Figure 11A:
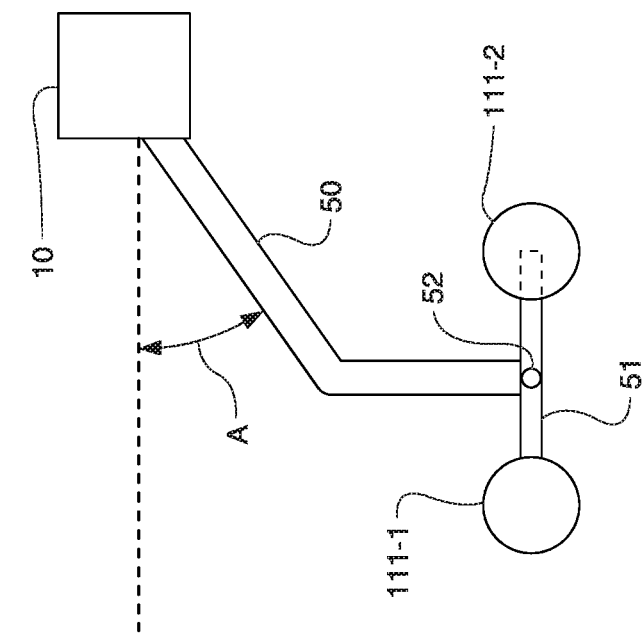
Figure 11B:
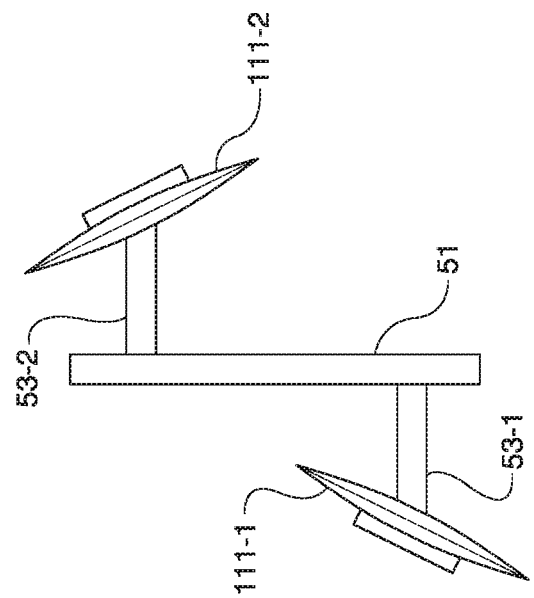
Figure 10:
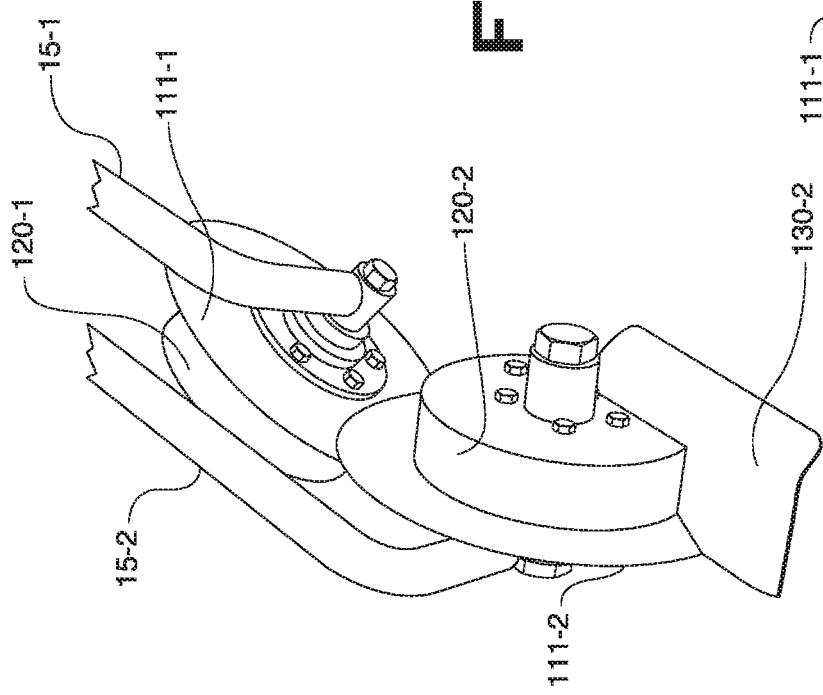
Figure 12:
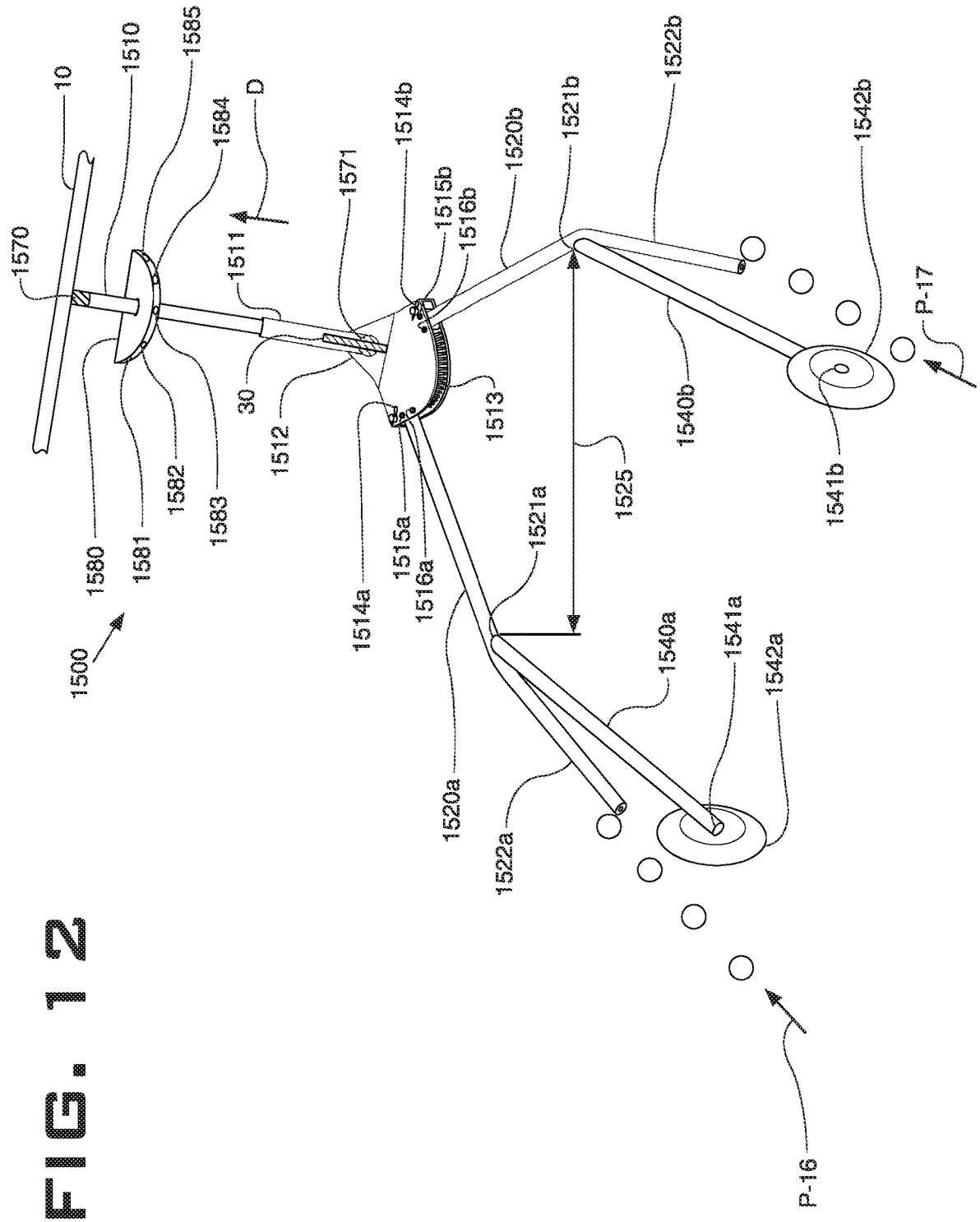

To regulate the depth that disc 111 penetrates the soil, disc 111 can further include a depth guide 120. Depth guide 120 is illustrated in FIGS. 7A, 7B, and 10. Any of the discs 111 in any embodiment described herein can have a depth guide 120. Depth guide 120 is a cylinder having a diameter that is less than the diameter of disc 111. The greater the difference in diameter determines the depth that disc 111 can penetrate the soil.

Disc 111 and depth guide 120 can be made as a unitary part, or they can be separate parts.

In addition to or individually from depth guide 120, support member 15 can additionally contain a ski (121 or 122) or a wheel (123 or 124) to regulate the depth that disc 111 penetrates the soil. Illustrated in FIG. 4B, ski 121-1 is disposed under support member 15 ahead of disc 111. Illustrated in FIG. 4C, ski 122-1 is disposed at the end of support member 15 behind disc 111. Illustrated in FIG. 4D, wheel 123-1 is disposed on support member 15 ahead of disc 111. Illustrated in FIG. 4E, wheel 124-1 is disposed on support member 15 behind disc 111.

Disc 111 can be adjusted to adjust one or more of camber angle, toe angle, and depth to adjust the distance that soil is moved from between the rows to the rhizosphere or to the plants 5 and/or the amount of soil that is moved. Also, the diameter of disc 111 can be adjusted to change the amount of soil that is moved.

Plow 112 can be any shaped plow blade or moldboard.

In another embodiment, fluid covering implement 100 further includes a deflector 130. Deflector 130 can keep the soil from being thrown too high or too far. As illustrated in FIGS. 7B and 10, deflector 130 can be disposed adjacent to disc 111 in the direction of soil movement. Deflector 130 can have any shape to deflect the soil. Deflector 130 can be disposed at any rotational angle with respect to a transverse plane passing through disc 111 transverse to the direction of travel. This allows for the adjustment of the height of the side edge 132 of deflector 130 from the ground. Deflector 130 can be disposed at any rotational angle with respect to a plane aligned with the direction of travel. This allows for the adjustment of the height of the rear edge 131 of deflector 130 from the ground. Side edge 132 and/or rear edge 131 can have a surface that is curved towards the ground.

Figure 3:
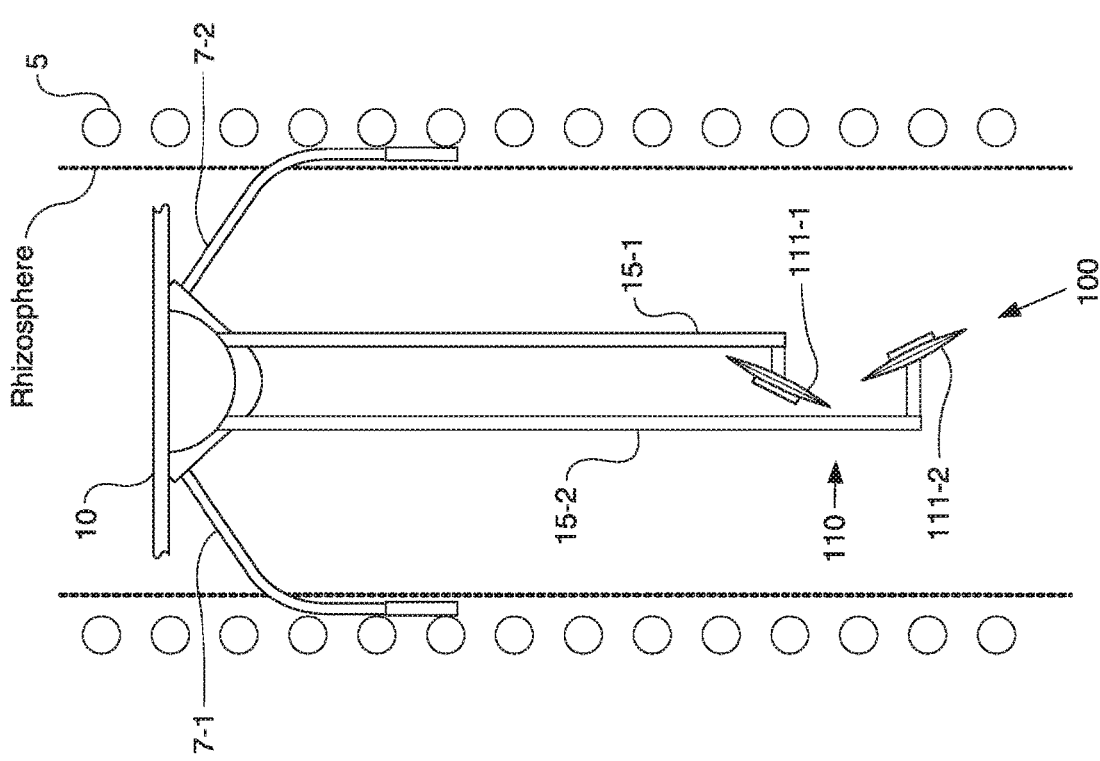

Fluid covering implement 100 can be installed on any implement that dispenses fluids to row crops. Examples of implements include, but are not limited to, sprayers, high clearance sprayers, side dress toolbars, planter row units, planter row unit toolbars, and cultivator toolbars. FIGS. 1 to 4 illustrate attachment of the fluid covering implement 100 to the frame 10 of an implement (such as a toolbar, a boom, a toolbar on mounted to a boom). FIGS. 1 to 3 are top plan views, and FIGS. 4A to 4E are side elevation views of the embodiment of FIG. 1 with the liquid application removed. Any of the embodiments in FIGS. 2 to 3 can be attached to frame 10 the same as is shown in any of FIGS. 4A to 4E.

A vertical member 18 is attached to frame 10 and extends down towards the soil. A support member 15 is attached to vertical member 18 at the end opposite of frame 10. This attachment can be fixed or it can be pivotable. Illustrated in FIGS. 4A to 4E is pivot 12. Support member 15 extends rearward opposite the direction of travel. The length of support member 15 is sufficient to have soil mover 110 disposed after fluid is applied to the row crops so that soil can be moved to cover the fluid. FIG. 1 illustrates discs 111-1 and 111-2 disposed on an axle 16 through support member 15. FIG. 2 illustrates offset discs 111-1 and 111-2 independently attached with axles 17-1 and 17-2 to support member 15. FIG. 3 illustrates that discs 111-1 and 111-2 can be independently attached to their own vertical member 18-1 and 18-2 (not shown) and support member 15-1 and 15-2, respectively. While support members 15-1 and 15-2 can have the same length, one support member 15-1 or 15-2 can be longer so that discs 111-1 and 111-2 can be disposed in line with each other to save space when there are narrow rows.

When support member 15 is pivotably connected to vertical member 18, a biasing member 30 can be disposed between vertical member 18 and support member 15 to urge support member 15 and discs 111 to the ground. Biasing member can be any device that applies a force. Examples include, but are not limited to, springs, air cylinders, hydraulic cylinders, or actuators. In some embodiments, the biasing member can apply both a down force and a lift force on support member 15. Lift force is useful to lift support member 15 to disengage ground contact, such as when making a turn. In one embodiment, biasing member is a dual acting air cylinder that applies both a down force and a lift force. An example of a dual acting air cylinder is described in U.S. Pat. No. 8,550,020, which is incorporated herein by reference. Another example is CleanSweep™ air cylinders available from Precision Planting LLC. Biasing member 30 can be actuated implement wide, section wide, or row by row. Biasing member 30 is illustrated in FIGS. 4A to 4E with the dual acting air cylinder from U.S. Pat. No. 8,550,020 having air lines 31 and 32.

Figure 5:
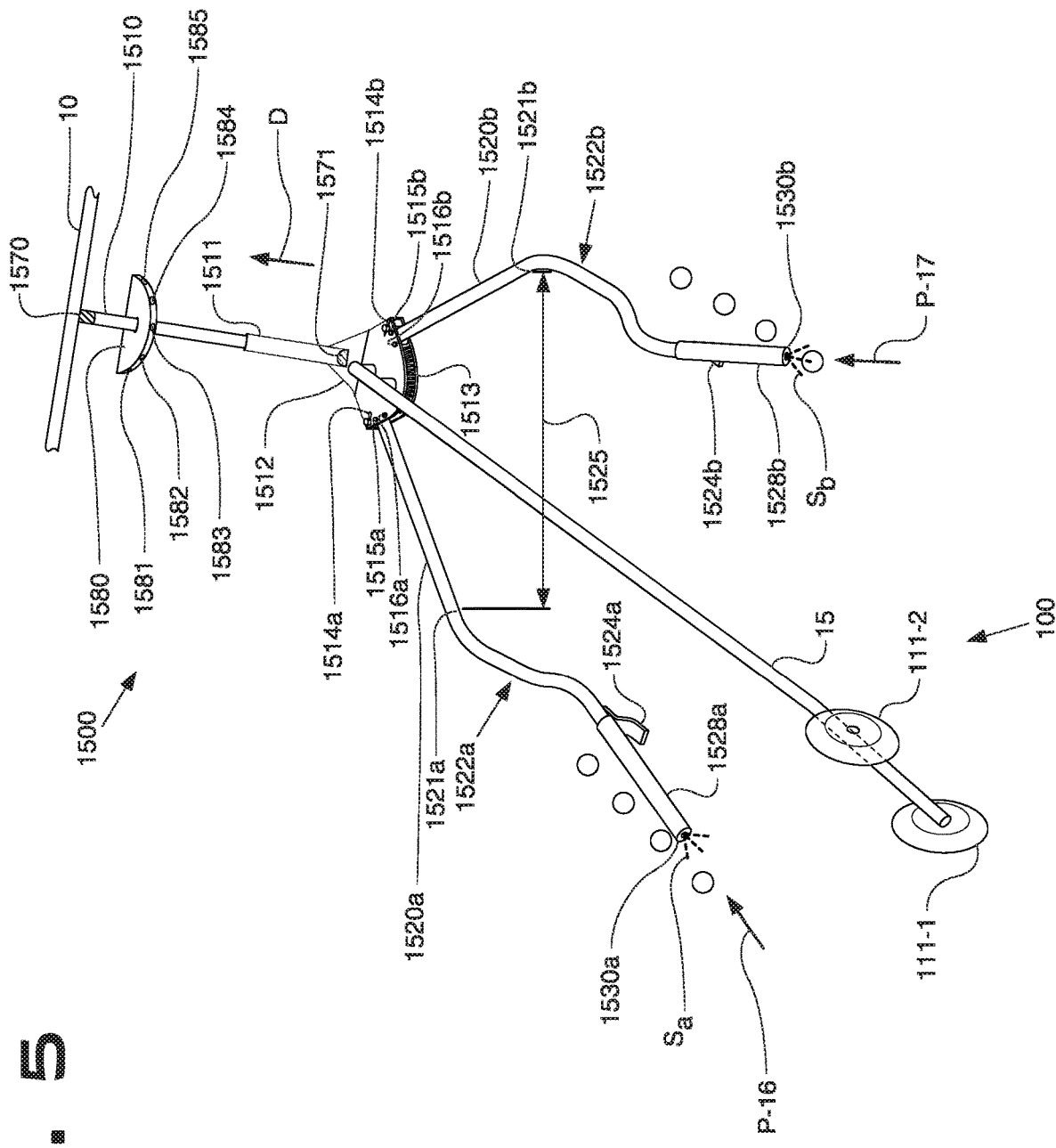
Figure 6B:
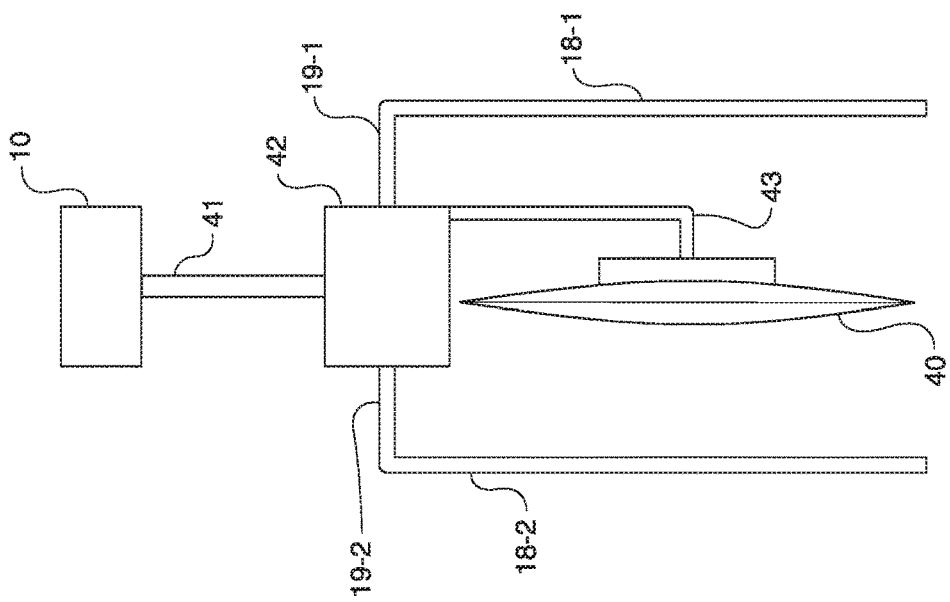
Figure 6A:
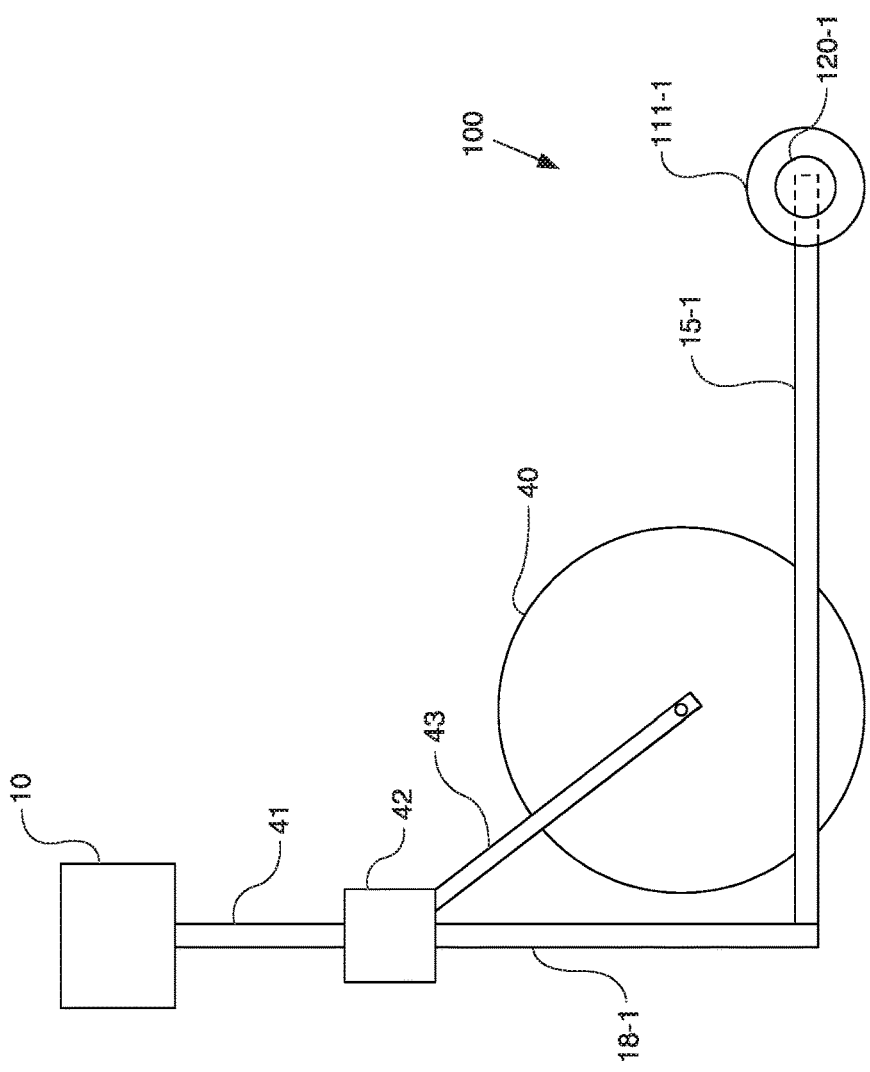

In another embodiment, support member can be connected to a fluid application unit. FIG. 5 illustrates application unit 1500, which is described in U.S. Application No. 62/442,895. FIG. 5 illustrates an isometric view of an application unit 1500 in accordance with one embodiment. The application unit 1500 is preferably mounted to a transversely extending bar 10 (e.g., toolbar or boom) drawn by a tractor or other implement. A frame 1510 (e.g., rigid frame 1510) is coupled to the bar 10, a frame 1511 (flexible frame, rigid frame), and a base 1512. It should be appreciated that frame 1510 and 1511 could be a unitary part. The base 1512 includes a biasing element 1513 (e.g., spring) to bias or position linkage members 1520a, 1520b such that distal ends 1521a, 1521b of the linkage members 1520a, 1520b have a spacing 1525 that is similar to a row spacing of the rows of plants P-16, P-17. In one example, the application unit 1500 includes ground contacting members 1524a, 1524b (e.g., ski, skid, wear element, etc.) at least partially contacting the ground while in operation with the application unit 1500 moving in a direction D that is substantially parallel with respect to rows of plants P-16 and P-17. The ground contacting members 1524a, 1524b substantially prevent the flexible members 1522a, 1522b from contacting the ground and thus reduce wear on the flexible members 1522a, 1522b. The ground contacting members 1524a, 1524b also position the flexible members 1522a, 1522b to be slightly elevated (e.g., 0 to 3 inches) above the ground.

Fluid outlets 1530a, 1530b (e.g., spray nozzle, drip mechanism) are positioned with respect to a distal portion 1528a, 1528b of flexible members 1522a, 1522b for spraying a fluid in close proximity to the plants. In one example, the fluid outlets are positioned at a distal end of the distal portions of the flexible members and generate a spray Sa, Sb that sprays in a downward direction towards a base region of plants P-16, P-17, respectively. It should be appreciated that each fluid outlet in the various embodiments described herein is preferably in fluid communication with a fluid source (e.g., tank) containing an application (e.g., fluid application, crop inputs such as fertilizer, fungicide, herbicide or insecticide). The base 1512 also includes pins 1514a, 1514b positioned in holes to set a width for biasing of the linkage members for different crop row spacing. The base 1512 includes additional holes 1515a, 1515b and 1516a, 1516b to reduce a width of the linkage members 1520a, 1520b to adjust for different crop row spacing or for different types of crops. For a turn of a tractor and an implement having a plurality of application units 1500, the biasing element and pins cause the flexible members to flex inwards. Optionally, a rotating swivel 1570 or 1571 can be disposed between bar 10 and frame 1510 and/or between frame 1511 and base 1512. The degree of rotation can be any desired degree, but actual rotation will be limited by the movement in the rows. Having a rotating swivel 1570 or 1571 provides more flexibility during use to keep application unit 1500 in the row without providing too much force on the plants. Support member 15 is connected to frame 1511.

In another embodiment, the application unit 1500 optionally includes a housing member 1580 for positioning a plurality of fluid outlets (e.g., 1581-1585) at a plurality of different angles (e.g., angled down towards ground, angle outwards from the housing member 1580) having a maximum range of approximately 180 degrees. Additional or fewer fluid outlets can be positioned with the housing member 1580. Each fluid outlet can have a fixed position or an adjustable angular position for spraying a fluid towards a base region of the plants or towards a certain target region between the rows of plants P-16, P-17. The fluid sprayed by the fluid outlets 1581-1585 can be the same fluid that is spraying by the fluid outlets 1530a, 1530b or this fluid can be different. In one example, the fluid outlets 1581-1585 spray a fungicide.

Fluid covering implement 100 can also be used on side dress bars that have a coulter 40. An example is illustrated in FIGS. 6A and 6B. In a typical side dress bar, coulter 40 is connected via a coulter mounting arm 43 to a bracket 42 then to a tool bar arm 41 that is connected to frame 10. Fluid covering implement 100 can attach to bracket 42 with side support arms 19-1 and 19-2 connected to vertical members 18-1 and 18-2, respectively, then to support members 15-1 and 15-2, respectively, each having discs 111-1 and 111-2 and depth guide 120-1 and 120-2, respectively.

In another embodiment illustrated in FIG. 8, plow 112 has plow blades 112-1 and 112-2. Support arm 14 is attached to frame 10 and extends rearward opposite the direction of travel. At the end opposite the frame 10, connecting member 13 is connected to support arm 14 and disposed downward between blow blades 112-1 and 112-2 and connected to plow blades 112-1 and 112-2.

In another embodiment illustrated in FIG. 9, fluid covering implement 100 having knives 113-1 and 113-2. A vertical member 18 is attached to frame 10 and extends down towards the soil. A support member 15 is attached to vertical member 18 at the end opposite of frame 10. This attachment can be fixed or it can be pivotable. Support member 15 extends rearward opposite the direction of travel. The length of support member 15 is sufficient to have soil mover 110 disposed after fluid is applied to the row crops so that soil can be moved to cover the fluid. FIG. 9 illustrates discs 113-1 and 113-2 disposed on a cross member 11 through support member 15. Similar to FIG. 1, attachment to frame 10 can be the same as illustrated in any of FIGS. 4A to 4E.

FIG. 10 shows a perspective view of offset discs with depth guides and deflector according to one embodiment. Discs 111-1 and 111-2 can be independently attached to their own vertical member 18-1 and 18-2 (not shown) and support member 15-1 and 15-2, respectively. To regulate the depth that discs 111-1 and 111-2 penetrate the soil, the discs can further include a depth guide 120-1 and 120-2. Deflector 130-2 can be disposed adjacent to disc 111-2 in the direction of soil movement.

In another embodiment illustrated in FIGS. 11A and 11B, a support member 50 is connected to frame 10 at one end and to a beam 51 at the other end. Beam 51 may fixedly or pivotably attached to support member 50. When pivotably attached, support member 50 and beam 51 are connected through pivot 52. Discs 111-1 and 111-2 are attached to beam 51 with axles 53-1 and 53-2, respectively. The angle A between the horizontal plane (parallel to the ground) and support member 50 can be adjusted to change the angle of penetration of discs 111-1 and 111-2 in the soil.

In another embodiment illustrated in FIG. 12, soil is not displaced from the middle of the row but rather adjacent to or in the rhizosphere. There may be instances when it is not desired to disturb the soil between the row, such as when an herbicide or insecticide has already been applied. This embodiment can minimize soil disturbance since soil does not have to be moved a great distance to cover fluid deposited in the rhizosphere. FIG. 12 is a perspective view of a modification of application unit 1500, which is described in U.S. Application No. 62/442,895, and which is described above. Any of the discs 111 described above can be used as discs 1542*a*, 1542*b* in this embodiment. Discs 1542*a*, 1542*b* are connected to axles 1541*a*, 1541*b*, respectively, to extension 1540*a*, 1540*b*, respectively, which are connected to linkage members 1520*a*, 1520*b*, respectively. Extension 1540*a*, 1540*b* are of sufficient length so that discs 1542*a*, 1542*b* are disposed behind flexible members 1522*a*, 1522*b*, respectively, along a direction of travel. Linkage members 1520*a*, 1520*b* are sufficiently rigid to keep discs 1542*a*, 1542*b* adjacent to or in the rhizosphere. While illustrated with this embodiment, the assembly of discs 1542*a*, 1542*b*, axles 1541*a*, 1541*b*, and extensions 1540*a*, 1540*b* can be attached to other structures such that discs 1542*a*, 1542*b* are adjacent to or in the rhizosphere. Optionally, a biasing member 30 can be disposed between base 1512 and frame 1511 to bias the base 1512 and thus discs 1542*a*, 1542*b* to the ground.

Illustrated in FIGS. 13A and 13B is another embodiment in which discs 1542*a*, 1542*b* and axles 1541*a*, 1541*b* from FIG. 12 are replaced with a soil roughener 1550*a*, 1550*b*. Soil roughener 1550*a*, 1550*b* are connected to extensions 1540*a*, 1540*b*, respectively. FIG. 13B is a side elevation view of one soil roughener 1550 and extension 1540. Soil roughener 1550 is any structure that engages soil to loosen and move the soil to cover fluid. Illustrated in FIG. 13B, soil roughener 1550 has spikes 1551 that extend down from soil roughener 1550 to engage with soil.

FIG. 14 illustrates another embodiment that includes drag chains 1560*a*, 1560*b* that are connected to linkage members 1520*a*, 1520*b*, respectively. The length of the chains 1560*a*, 1560*b* are sufficient so that the trailing loop of the chains 1560*a*, 1560*b* are disposed behind flexible members 1522*a*, 1522*b*, respectively, along a direction of travel.

FIG. 15 illustrates a method 1501 for covering fluid deposited in the rhizosphere of plants growing in a field in accordance with one embodiment. In one example, an implement and a soil moving implement perform this method. At operation 1502, the method includes depositing fluid in the rhizosphere of plants while driving an implement through the field. At operation 1504, the method further includes moving soil from between rows of plants to at least the rhizosphere of plants to cover the fluid. The soil may be moved from a middle region to cover soil of the rhizophere.

In one example, moving soil from between rows of plants to at least the rhizosphere of plants to cover the fluid comprises moving soil from a middle region between rows of plants to 0 to 5 inches from the plants.

In another example, moving soil from between rows of plants to at least the rhizosphere of plants to cover the fluid comprises moving soil from a middle region between rows of plants to 0 to 3 inches from the plants.

In another example, moving soil from between rows of plants to at least the rhizosphere of plants to cover the fluid comprises moving soil from being adjacent to a row of plants or in the rhizosphere as illustrated in FIGS. 12, 13A, and 14 to 0 to 5 inches from the plants.

What is claimed is:

1. An implement for depositing fluid in the rhizosphere of plants growing in a field and for covering the fluid, the implement comprising:
   a frame;
   an implement configured to dispense fluids, wherein the implement further comprises a vertical member attached to the frame and extending down towards soil in the field;
   a support member being pivotably attached to the vertical member at an opposite end to the frame;
   a soil moving implement attached to the support member and disposed in a middle region between first and second rows of plants that moves soil from the middle region between the first and second rows to at least the rhizosphere of at least one of the first and second row of plants to cover fluid deposited in the rhizosphere as the soil moving implement traverses the field;
   a biasing member disposed between the vertical member and the support member, wherein the biasing member is configured to apply a down force on the soil moving implement towards the soil to engage the soil moving implement with the soil, wherein the biasing member is configured to apply a lift force on the support member to disengage the soil moving implement from the soil; and
   a cylindrically shaped depth guide attached to the soil moving implement to regulate a depth of the soil moving implement into the soil, wherein the soil moving implement and the cylindrically shaped depth guide rotate with a same axis of rotation, wherein the soil moving implement comprises at least one disc and the depth guide has a constant diameter that is less than a diameter of the at least one disc.

2. The implement of claim 1, wherein the soil moving implement moves soil to one of 0 to 5 inches from the plants, 0 to 4 inches from the plants, 0 to 3 inches from the plants, 0 to 2 inches from the plants, or 0 to 1 inch from the plants.

3. The implement of claim 1, wherein the soil moving implement comprises at least one disc to move soil to at least the rhizosphere of the plants.

4. The implement of claim 3, further comprising a deflector that is disposed adjacent to the at least one disc in a direction of soil movement.

5. The implement of claim 1, wherein the soil moving implement is disposed in the middle region between a rhizosphere of the first row of plants and a rhizosphere of the second row of plants, wherein an edge or boundary of the middle region is 3 to 15 inches from each rhizosphere of the first and second row of plants.

6. The implement of claim 1 wherein the soil moving implement further comprises an axle disposed through the support member with a first disc disposed on a first end of the axle and a second disc disposed on a second end of the axle.

7. The implement of claim 6, wherein the soil moving implement comprises at least one disc to move soil to at least the rhizosphere of the plants, and the depth guide comprises a cylinder disposed adjacent to the at least one disc.

8. The implement of claim 1, wherein at least one disc is disposed on the support member that is attached to the frame.

9. The implement of claim 8, further comprising a ski that is disposed under the support member, or the ski is disposed on the support member at a rearward end of the support member along a direction of travel.

10. The implement of claim 1, wherein the soil moving implement that is disposed in the middle region between the first and second rows of plants comprises a first disc attached to the support member to move soil from the middle region towards the first row of plants and a second disc attached to a different support member to move soil from the middle region towards the second row of plants.

11. The implement of claim 10, wherein the support member and the different support member have different lengths.

12. The implement of claim 6 further comprising a deflector that is disposed adjacent to the depth guide in a direction of soil movement.

13. The implement of claim 1, wherein the support member is disposed rearwardly along a direction of travel, and the soil moving implement is disposed on the support member.

14. The implement of claim 8, wherein the support member is disposed rearwardly along a direction of travel, and the soil moving implement is disposed on the support member.

15. The implement of claim 1, wherein the soil moving implement comprises a first disc moving soil in a first direction and a second disc moving soil in a second direction opposite the first direction, wherein the first disc is attached at a first position on the support member and the second disc is attached at a second position on the support member that is further from the frame than the first position.

16. The implement of claim 1, wherein the biasing member comprises a first end that is attached to the vertical member and a second end that is attached to the support member.

17. A method for covering fluid deposited in the rhizosphere of plants growing in a field comprising:
   depositing fluid in the rhizosphere of plants while driving an implement through the field;
   moving soil with a soil moving implement from a middle region between first and second rows of plants to at least the rhizosphere of at least one of the first and second rows of plants to cover the fluid deposited in the rhizosphere;

applying a down force on the soil moving implement towards the soil based on a biasing member being disposed between a vertical member and a support member of the implement to engage the soil moving implement with the soil, wherein the biasing member is configured to apply a lift force on the support member to disengage the soil moving implement from the soil; and regulating a depth of the soil moving implement into the soil based on a cylindrically shaped depth guide being attached to the soil moving implement, wherein an edge or boundary of the middle region is 3 to 15 inches from each rhizosphere of the first and second row of plants, wherein the soil moving implement and the cylindrically shaped depth guide rotate with a same axis of rotation, wherein the soil moving implement comprises at least one disc and the depth guide has a constant diameter that is less than a diameter of the at least one disc.

18. An implement for covering fluid deposited by an apparatus that deposits fluid in the rhizosphere of plants growing in a field comprising:

a support member;

a vertical member attached to the support member and extending down towards soil in the field;

a soil mover attached to a distal end of the support member, wherein the soil mover is disposed adjacent to the rhizosphere to move soil from being adjacent the rhizosphere to the rhizosphere to cover fluid deposited by the apparatus in the rhizosphere;

a biasing member disposed between the vertical member and the support member is configured to apply a down force on the soil mover towards the soil to engage the soil mover with the soil, wherein the biasing member is configured to apply a lift force on the support member to disengage the soil mover from the soil; and a cylindrically shaped depth guide attached to the soil mover to regulate a depth of the soil mover into the soil, wherein the soil mover and the cylindrically shaped depth guide rotate with a same axis of rotation, wherein the soil moving implement comprises at least one disc and the depth guide has a constant diameter that is less than a diameter of the at least one disc.

19. The implement of claim 18, wherein the soil mover comprises a first disc to move soil from being adjacent to a first row of plants to 0 to 5 inches from the first row of plants.

20. The implement of claim 19, wherein the soil mover comprises a second disc to move soil from being adjacent to a second row of plants to 0 to 3 inches from the second row of plants.

21. The implement of claim 18, wherein the soil mover comprises one of at least one disc, at least one soil roughener, or at least one chain.

22. The method of claim 18, wherein the soil mover comprises an adjustable disc to adjust one or more of camber angle, toe angle, and depth to adjust a distance that soil is moved from being adjacent the rhizosphere to the rhizosphere to cover fluid deposited by the apparatus in the rhizosphere.

23. The method of claim 18, wherein the soil mover comprises an adjustable disc to adjust a diameter of the disc to change an amount of soil that is moved.

* * * * *